(12) United States Patent
Giaever et al.

(10) Patent No.: US 10,669,170 B2
(45) Date of Patent: Jun. 2, 2020

(54) ELECTROFLOTATION APPARATUS HAVING AN OUTLET PIPE WITH A LOW TURBULENCE ORIFICE

(71) Applicant: Axolot Solutions Holding AB, Helsingborg (SE)

(72) Inventors: Stig Giaever, Ljungskile (SE); Daniel Holm, Öjersjö (SE)

(73) Assignee: AXOLOT SOLUTIONS HOLDING AB, Helsingborg (SE)

( * ) Notice: Subject to any disclaimer, the term of this patent is extended or adjusted under 35 U.S.C. 154(b) by 205 days.

(21) Appl. No.: 15/766,097

(22) PCT Filed: Oct. 7, 2016

(86) PCT No.: PCT/EP2016/074055
§ 371 (c)(1),
(2) Date: Apr. 5, 2018

(87) PCT Pub. No.: WO2017/060462
PCT Pub. Date: Apr. 13, 2017

(65) Prior Publication Data
US 2018/0297868 A1    Oct. 18, 2018

(30) Foreign Application Priority Data
Oct. 8, 2015   (SE) ........................ 1551302

(51) Int. Cl.
*C02F 1/463* (2006.01)
*C02F 1/46* (2006.01)
(Continued)

(52) U.S. Cl.
CPC ............ *C02F 1/463* (2013.01); *B03D 1/1437* (2013.01); *B03D 1/1456* (2013.01); *C02F 1/465* (2013.01);
(Continued)

(58) Field of Classification Search
CPC .......... B03D 1/00; B03D 1/14; B03D 1/1437; B03D 1/1443; B03D 1/1456; C02F 1/00;
(Continued)

(56) References Cited

U.S. PATENT DOCUMENTS

| 3,726,780 A | 4/1973 | Hamden et al. |
| 4,490,259 A | 12/1984 | Coifing |
| 4,802,991 A | 2/1989 | Miller |
| 2014/0346056 A1 | 11/2014 | Kling Miller et al. |

FOREIGN PATENT DOCUMENTS

| CA | 1 232 570 A1 | 2/1988 |
| SU | 424601 A1 * | 4/1974 |

(Continued)

OTHER PUBLICATIONS

Machine translation of SU 424601A, which was published Oct. 3, 1974. (Year: 1974).*

(Continued)

*Primary Examiner* — Natasha E Young
(74) *Attorney, Agent, or Firm* — Renner, Otto, Boisselle & Sklar, LLP

(57) ABSTRACT

An electroflotation apparatus for removing impurities from waste water includes an electrolytic cell for treating the waste water and generating a flock containing the impurities and an outlet pipe having a linear central axis located co-axially with the electrolytic cell for passing the water and flock from the electrolytic cell to a separation area. The outlet pipe comprises a first end connected to the electrolytic cell and having a first diameter, and a second end through which the treated water and flock exit the outlet pipe, the second end having a second diameter. The outlet pipe reduces the turbulence of the treated water from the electrolytic cell before the treated water is passed to the separation area such that aggregation of the flock in the separation area is increased.

20 Claims, 5 Drawing Sheets

(51) Int. Cl.
*B03D 1/14* (2006.01)
*C02F 1/465* (2006.01)
*C02F 1/461* (2006.01)

(52) U.S. Cl.
CPC .... *C02F 1/46114* (2013.01); *C02F 2201/003* (2013.01); *C02F 2201/4611* (2013.01); *C02F 2301/022* (2013.01)

(58) Field of Classification Search
CPC ........ C02F 1/46; C02F 1/461; C02F 1/46104; C02F 1/46109; C02F 1/46114; C02F 1/463; C02F 1/465; C02F 2201/00; C02F 2201/002; C02F 2201/003; C02F 2201/46; C02F 2201/461; C02F 2201/46105; C02F 2201/4611; C02F 2301/00; C02F 2301/02; C02F 2301/022
See application file for complete search history.

(56) References Cited

FOREIGN PATENT DOCUMENTS

| | | | |
|---|---|---|---|
| SU | 424601 | * | 10/1974 |
| WO | 1993/013021 | A1 | 7/1993 |
| WO | 1996/015989 | A1 | 5/1996 |
| WO | 2003/062152 | A1 | 7/2003 |
| WO | 2011/018556 | A1 | 2/2011 |
| WO | 2011/023851 | A1 | 3/2011 |

OTHER PUBLICATIONS

International Search Report for corresponding International Application No. PCT/EP2016/074055 dated Nov. 24, 2016.
Written Opinion of the International Searching Authority for corresponding International Application No. PCT/EP2016/074055 dated Nov. 24, 2016.

* cited by examiner

ELECTROFLOTATION APPARATUS HAVING AN OUTLET PIPE WITH A LOW TURBULENCE ORIFICE

This application is a national phase of International Application No. PCT/EP2016/074055 filed Oct. 7, 2016, and claims priority to Swedish Application No. SE 1551302-1 filed on Oct. 8, 2015, which is incorporated herein by reference.

FIELD OF THE INVENTION

The present invention relates to an electroflotation apparatus for removing impurities from waste water. More particularly, the invention relates to an electroflotation apparatus comprising an outlet pipe with a low turbulence orifice.

BACKGROUND

The treatment of waste water and sewage by electroflotation to remove impurities is well known in the art. Such treatment of waste water generally involves an initial electrocoagulation step in which the waster water is fed into an electrolytic cell where electrical impulses are applied to the water to generate a flock containing the impurities. A flotation step follows in which the flock rises to the surface of the water where it can be removed by mechanical methods external to the electrolytic cell. See for example, U.S. Pat. No. 3,726,780. The treated water and flock are re-used or disposed of appropriately.

WO 2011/023851 and WO 2011/018556 disclose electroflotation methods and apparatuses for purification of water involving separation of the flock from the treated water in an area located above the electrolytic cell. However, a problem with the apparatuses disclosed by WO 2011/023851 and WO 2011/018556 is that the flock aggregate is readily broken up by the turbulent water flow exiting the electrolytic cell thereby hampering separation of the flock from the treated water. This limits operation of the apparatuses to lower water throughputs to ensure adequate water/flock separation.

WO 96/15989 discloses a flock separating apparatus for use in sewage or sludge treatment. The apparatus has an electrolytic cell and a separating tank. The flock generated is carried upward out of the cell and into the separating tank by hydrogen gas produced in the electrocoagulation step. The flock continues to rise in the separating tank while the treated water passes from the separating tank into a receiving and discharge tank. Although such passage decelerates the climbing speed of the water relative to that of the flock thereby improving the water/flock separation efficiency, it is necessary for the receiving and discharge tank to have a surface area that is many times larger than that of the separating tank. WO 03/062152 discloses a method and apparatus for removing impurities from waste water by electroflotation. The waste water passes through an electrolytic cell with a wearing and a non-wearing electrode to produce a flock that is conveyed to a flock and purified water separation tower. Purified water and flock are conducted from the bottom and top ends of the tower respectively. The apparatuses of WO 96/15989 and WO 03/062152 require relatively complex engineering designs and a longer time is required to achieve separation of the flock from the treated water. This increases operation costs.

CA 1232570 A1 purportedly teaches an apparatus for electrochemical purification of contaminated liquids. A section of the coagulation chamber accommodated in the settling chamber and the separating wall are fashioned as truncated cones facing by their large bases the froth collector, the mixing chamber having perforated damping partitions. It would be desirable to provide an electroflotation apparatus that is simple in design yet capable of removing impurities from waste water at higher water throughputs whilst retaining an aggregate of the generated flock.

SUMMARY OF THE INVENTION

Consequently, the present invention seeks to mitigate, alleviate, eliminate or circumvent one or more of the above-identified deficiencies in the art and disadvantages singly or in any combination by providing, in one aspect, an electroflotation apparatus for removing impurities from waste water comprising:

an electrolytic cell for treating the waste water and generating a flock containing the impurities;

an outlet pipe having a linear central axis located co-axially with the electrolytic cell for passing the treated water and flock from the electrolytic cell to a separation area, the outlet pipe comprising:

a first end connected to the electrolytic cell and having a first diameter;

a second end through which the treated water and flock exit the outlet pipe, the second end having a second diameter; and a length extending between the first diameter and the second diameter;

wherein the ratio of the second diameter to the first diameter is between 1.5:1 and 6:1; and wherein the ratio of the length to the first diameter is between 7:1 and 45:1;

in order that the outlet pipe reduces the turbulence of the treated water from the electrolytic cell before the treated water is passed to the separation area such that aggregation of the flock in the separation area is increased. The design of the outlet pipe is specifically made to reduce flow rate, to reduce turbulence of the treated water in the outlet pipe, and especially to reduce the turbulence of the treated water in being released into the separation area.

The electrolytic cell in the apparatus is not intended to be particularly limited. For instance, the electrolytic cell may have an inner electrode made of a non-wearing metal such as stainless steel, zinc, platinum, graphite, titanium, or boron-doped metals. The outer electrode may be made of a sacrificial metal such as iron, aluminium, or another metal capable of forming a metal hydroxide. The inner and outer electrodes may optionally be located co-axially to each other to define a cylindrical space between them where electrolysis of the waste water occurs. The inner and outer electrodes may be connected to negative and positive poles of a power source respectively. The thickness of the outer electrode is about 30 mm. The inner electrode may be non-wearing while the outer electrode may be consumed as electrolysis is performed. If the outer electrode is made of iron then the iron is oxidized from Fe to $Fe^{2+}$ and/or $Fe^{3+}$. The $Fe^{2+}/Fe^{3+}$ reacts with $OH^-$ ions in the water to form a positively charged iron hydroxide network that makes up a large proportion of the flock. Impurities are also absorbed onto the flock. Electrons from oxidation of the outer electrode combine with $H^+$ in the water to produce $H_2$ gas which rises and simultaneously assists in flotation of the flock. During use waste water is supplied at an appropriate position near the lower portion of the electrolytic cell and rises up through the cylindrical space where it is electrolysed and a flock is formed. The treated water and flock continue to rise up and out of the electrolytic cell. The electrolytic cell may be of any suitable size depending on the volume of waster water to be treated and the desired flow rate. For example, the diameter of the outer electrode may be up to 700 mm, preferably between 150 mm and 400 mm, more preferably between 250 mm and 350 mm, and even more preferably about 300 mm. The diameter of the outer electrode may be about 500 mm. Suitable electrolytic cells for use in the electroflotation apparatus of the present invention are disclosed in WO 96/15989 and WO 03/062152 but other electrolytic cells may of course be utilised.

In some embodiments the ratio of the second diameter to the first diameter is between 2:1 and 5:1, and more preferably between 2.5:1 and 4:1. Particularly preferred ratios of the second diameter to the first diameter are selected from the group consisting of 3.0:1, 3.1:1, 3.2:1, 3.3:1, 3.4:1, 3.5:1, and 3.6:1. In other embodiments the ratio of the second diameter to the first diameter is between 1.2:1 and 2:1, preferably between 1.2:1 and 1.7:1. Additional particularly preferred ratios of the second diameter to the first diameter are selected from the group consisting of 1.22:1, 1.3:1, 1.4:1, and 1.5:1.

In some embodiments the ratio of the length to the first diameter is between between 10:1 and 30:1, even more preferably between 14:1 and 22:1. A particularly preferred ratio of the length to the first diameter is about 17.3:1.

According to one embodiment the first diameter is between about 20 mm to 90 mm, preferably between about 30 mm to 80 mm, more preferably between about 40 mm to 60 mm, and even more preferably between about 45 mm to 50 mm. According to another embodiment the first diameter is about 50 mm.

In some embodiments the second diameter is between about 130 mm to 180 mm, preferably between about 140 mm to 170 mm, and more preferably between about 150 mm to 160 mm. According to another embodiment the second diameter is about 155 mm. In other embodiments the second diameter is smaller and is between about 50 mm to 100 mm, preferably between about 50 to 80 mm, more preferably between about 50 mm to 65 mm, and even more preferably about 55 mm. For example, the first diameter may be about 45 mm and the second diameter about 55 mm.

In other embodiments the first and second diameters of the outlet pipe are larger to allow for higher throughputs of water. In some of these embodiments the first diameter is the same size as, or is slightly less than, the diameter of the outer electrode. This may be visualized in FIGS. 2, 3, 4, and 6 wherein the first diameter of the outlet pipe corresponds with the diameter of the electrolytic cell. For example, the first diameter of the outlet pipe may be up to 700 mm, preferably between 150 mm and 400 mm, more preferably between 250 mm and 350 mm, and even more preferably about 300 mm. The second diameter of the outlet pipe may be up to 2170 mm, preferably between 465 mm and 1240 mm, more preferably between 775 mm and 1085 mm, and even more preferably about 930 mm. The first diameter may also be about 500 mm and the second diameter about 1550 mm.

According to some embodiments the length is between about 600 mm to 1400 mm, preferably between about 700 mm to 1200 mm, and more preferably between about 800 mm to 1000 mm. According to another embodiment the length is about 867 mm.

Some embodiments relate to the outlet pipe being a truncated cone or a truncated hyperbolic cone. Alternative embodiments relate to the outlet pipe being a truncated parabolic cone. According to some embodiments the aperture ($2\theta$) of the truncated cone is less than 10°, preferably between 3° and 8°, even more preferably between 5° and 7°.

According to some embodiments the aperture of the truncated cone is between 6° and 8°. In some embodiments the aperture of the truncated cone is between 4.8° and 7.12°. According to some embodiments the aperture of the truncated cone is selected from the group consisting of 6.9°, 7°, 7.1°, 7.2°, and 7.3°.

In some embodiments the separation area is a cylindrical tube extending above the outlet pipe. In some embodiments, the cylindrical tube has a cylinder diameter and the ratio of the cylinder diameter to the second diameter is at least 1.5:1, preferably between 2:1 and 30:1, more preferably between 6:1 and 24:1. A particularly preferred ratio of the cylinder diameter to the second diameter is about 2.6:1.

In some embodiments the cylinder diameter is between about 250 mm to 600 mm, preferably between about 300 mm to 500 mm. According to another embodiment the cylindrical tube has an outer diameter of about 400 mm and an inner diameter of about 390 mm.

When the separation area is a cylindrical tube extending above the outlet pipe, the distance between the second end of the outlet pipe and the surface of the water or flock in the separation area is not intended to be particularly limited. In some embodiments, the distance between the second end of the outlet pipe and the surface of the water or flock in the separation area is between 900 mm and 1500 mm, preferably between 1000 mm and 1400 mm, and even more preferably between 1100 mm and 1300 mm.

Some embodiments relate to the separation area being a pool or a basin located above the outlet pipe or a lower portion of the electrolytic cell. Thus, in one embodiment the bottom of the pool or basin and the exit of the outlet pipe are located at the same level. Alternatively, the outlet pipe and an upper portion of the electrolytic cell may be located within the lower half of the pool or basin while the lower portion of the electrolytic cell is located below the bottom of the pool or basin.

Other embodiments relate to the separation area being a pool or a basin located to one side of the outlet pipe or the electrolytic cell. In these embodiments the pool or basin may be further located above the level of the outlet pipe or electrolytic cell. A pipe such as a curved pipe extends between the outlet pipe and the pool or basin for passing the treated water and flock from the outlet pipe to the pool or basin. In some embodiments, the apparatus comprises a linear stabilizing zone between the curved pipe and the pool or the basin. The linear stabilizing zone serves to stabilize aggregates to preserve them upon release into the pool or the basin and to increase aggregation of the flock in the separation area. In some embodiments, the apparatus comprises a conical outlet between the curved pipe and the pool or the basin. Also a conical outlet between the curved pipe and the pool or the basin may contribute to stabilizing aggregates to preserve them upon release into the pool or the basin and to increase aggregation of the flock in the separation area.

In alternative embodiments the separation area is a pool or a basin located below the electrolytic cell. The pool or basin may be further located to one side of the electrolytic cell. Again, a pipe such as a curved pipe extends between the outlet pipe and the pool or basis for passing the treated water and flock from the outlet pipe down to the pool or basin.

When a curved pipe is used the curved pipe may have any suitable diameter and bending radius for preserving laminar flow of the treated water. In some embodiments the diameter of the curved pipe is the same as the diameter of the second end of the outlet pipe. In some embodiments the diameter of the curved pipe is between about 130 mm to 180 mm, preferably between about 140 mm to 170 mm, and more preferably between about 150 mm to 160 mm. According to another embodiment the diameter of the curved pipe is about 155 mm. The diameter of the curved pipe may also be larger. In some embodiments the diameter of the curved pipe may be up to 2170 mm, preferably between 465 mm and 1240 mm, more preferably between 775 mm and 1085 mm, and even more preferably about 930 mm. The diameter of the curved pipe may also be about 1550 mm. In some embodiments the ratio of the curved pipe diameter to the first diameter is between 1.5:1 and 6:1, preferably between 2:1 and 5:1, and more preferably between 2.5:1 and 4:1. Particularly preferred ratios of the curved pipe diameter to the first diameter of the outlet pipe are selected from the group consisting of 3.0:1, 3.1:1, 3.2:1, 3.3:1, 3.4:1, 3.5:1, and 3.6:1.

In some embodiments, the ratio of the diameter of the curved pipe to the first diameter ($d_1$) the outlet pipe (402) is between 1.5:1 and 6:1, preferably between 2:1 and 5:1, and more preferably between 2.5:1 and 4:1.

The bending radius will depend on the flow rate of treated water and the diameter of the curved pipe. In some embodiments the bending radius of the curved pipe may be up to 6 meters. Preferably, the bending radius of the curved pipe will be between about 3 to 5 meters, or 2 to 4 meters, or 1 to 3 meters, or less than 2 meters, or less than 1 meter.

Some embodiments relate to the separation area being a pool or a basin located below the outlet pipe or a top portion of the electrolytic cell. In such embodiments the electrolytic cell is upside down so that the water to be treated moves downwards through the cell before exiting the outlet pipe into the pool or basin below. The speed of the flow will exceed the speed of the evolving gas.

In some embodiments the first end of the outlet pipe further comprises a cylindrical portion connected to the electrolytic cell. According to an embodiment, the cylindrical portion is between about 30 mm to 70 mm long, preferably about 50 mm long. The cylindrical portion may facilitate connection of the outlet pipe to the electrolytic cell during manufacture of the apparatus.

In some embodiments the Reynolds number for the flow at the second end of the outlet pipe is less than 3000, preferably less than 2300, and even more preferably less than 2000. Preferably, the Reynolds number at the second end of the outlet pipe is the range 1500 to 2000. Without wishing to be bound by theory, it is believed the Reynolds number of the water/flock flow exiting the outlet pipe is a useful indication of its turbulence. Reynolds numbers are dimensionless numbers expressed as the ratio of inertial (resistant to change) forces to viscous (heavy) forces. They indicate whether liquid flow is steady (i.e. streamlined or laminar with no eddies or swirls) or has unsteady fluctuations (i.e. the flow is turbulent). A Reynolds number of less than about 2000 indicates flow in a pipe is generally laminar (i.e. not turbulent), whereas values of greater than 3000 indicate turbulent flow.

BRIEF DESCRIPTION OF THE DRAWINGS

These and other aspects, features and advantages of which the invention is capable of will be apparent and elucidated from the following description of embodiments of the present invention, reference being made to the accompanying drawings, in which

FIGS. 1 to 4*a*, 5, and 6 are not drawn to scale.

DETAILED DESCRIPTION OF EMBODIMENTS

The following description focuses on embodiments of the present invention applicable to an electroflotation apparatus. However, it will be appreciated that the invention is not limited to these applications but may be applied to other separation processes which involve generation of a solid and subsequent separation of the solid from a liquid.

Figure 1:
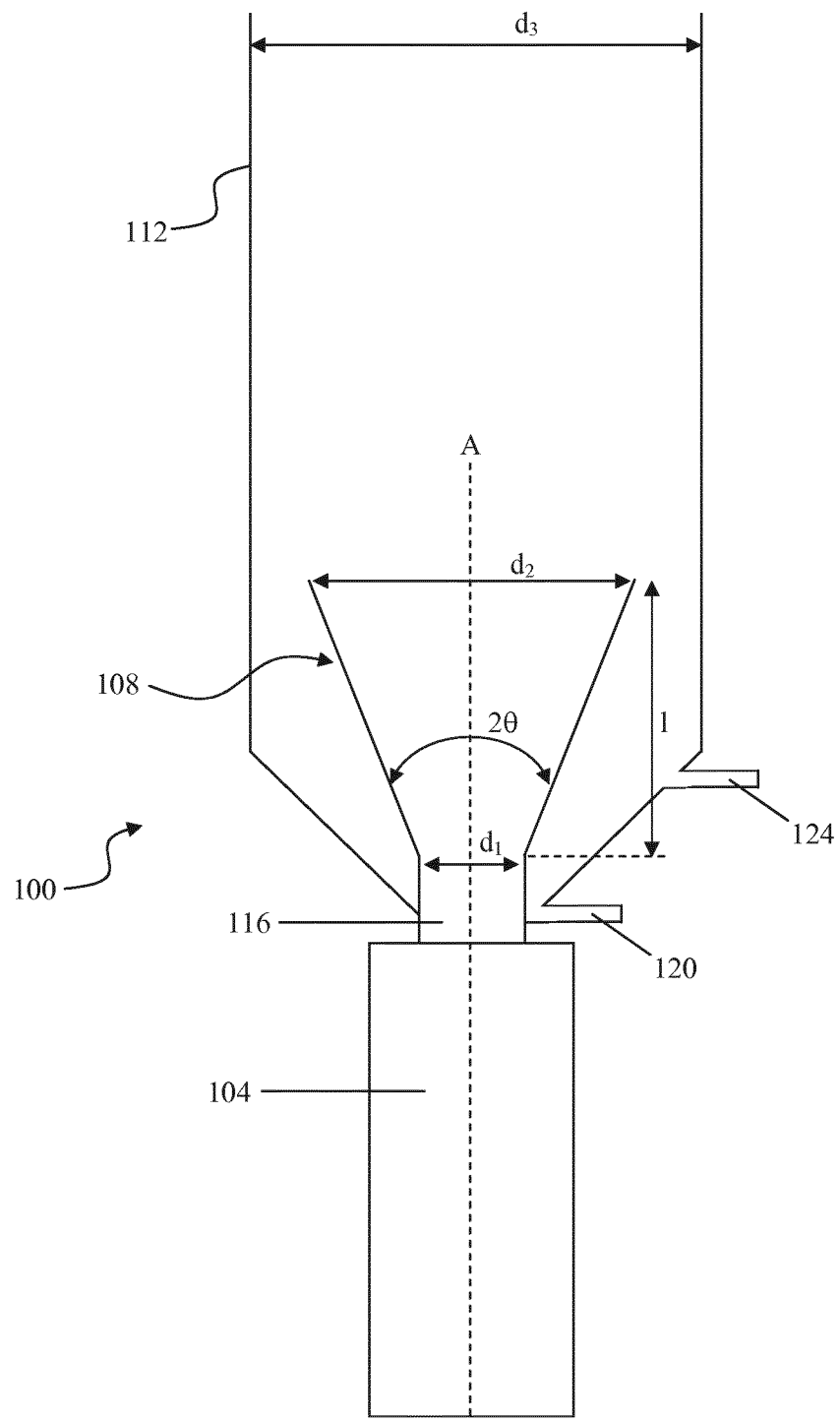
FIG. 1 is a side view of an electroflotation apparatus according to one embodiment of the invention.

FIG. 1 illustrates an electroflotation apparatus 100. The apparatus broadly comprises an electrolytic cell 104, an outlet pipe 108, and a separation area in the form of a cylindrical tube 112. The outlet pipe 108 is connected to the electrolytic cell 104 and serves to pass the flock and treated water from the electrolytic cell 104 in a vertical direction to the separation area 112. A first end of the outlet pipe 108 has a cylindrical portion 116 that is connected to the top of the electrolytic cell 104. The flock and treated water enter the first end of the outlet pipe 108 and pass through the pipe before exiting a second end of the outlet pipe 108. The flock rises up to the surface of the water in cylindrical tube 112 where it is removed by a suitable mechanical mechanism (not shown). Sedimented material that is heavier than water sinks to the bottom and is removed from the apparatus 100 through sediment outlet 120. Treated water is removed from the apparatus 100 through water outlet 124 and may be either recycled to electrolytic cell 104 for further treatment or disposed of appropriately. More than one water outlet 124 may be included on the apparatus 100.

The design of the outlet pipe 108 is an important feature of the invention. Outlet pipe 108 has a linear central axis (labeled A) located co-axially with the electrolytic call 104. The first and second ends of the outlet pipe 108 have first ($d_1$) and second ($d_2$) diameters respectively. A length (l) extends between the first ($d_1$) and second ($d_2$) diameters. The dimensions of the outlet pipe 108 are:

$d_1$: 50 mm
$d_2$: 155 mm
$d_3$: 400 mm
l: 867 mm
2θ: 7°

The ratio of $d_2:d_1$ is 3.1:1, the ratio of $l:d_1$ is 17.3:1, and the ratio of $d_3:d_2$ is 2.6:1. The distance between the second end of the outlet pipe 108 and the surface of the water or flock (not shown) in the cylindrical tube 112 is 1190 mm.

Figure 2:
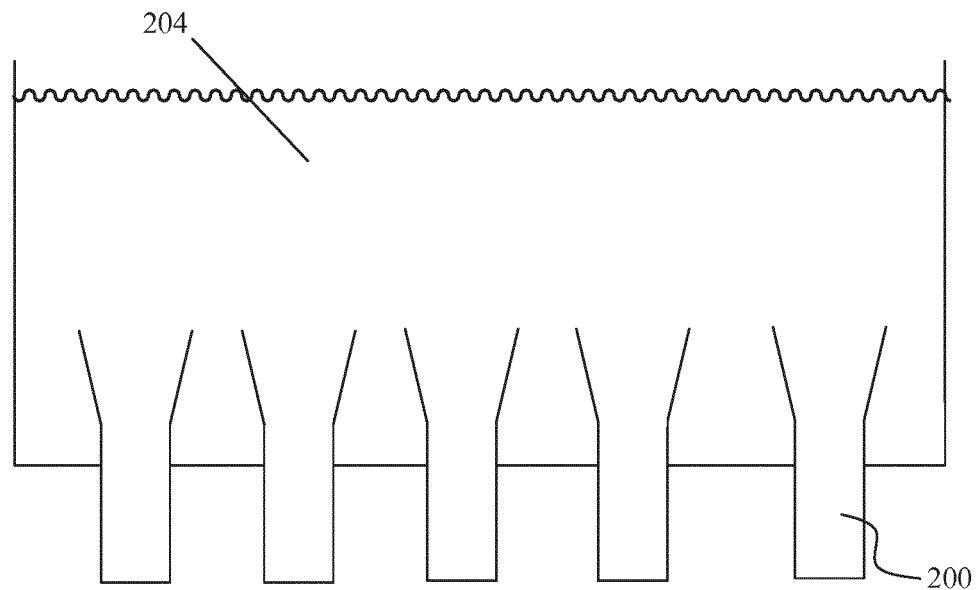
FIG. 2 is a side view of a pool with a plurality of electroflotation apparatuses according to an embodiment of the invention.

FIG. 2 illustrates a pool 204 with five electroflotation apparatuses 200 having their top portions located in the lower half of the pool 204 and their bottom portions located below the pool 204. Electroflotation apparatus 200 is similar in design and operation to electroflotation apparatus 100. Pool 204 provides a larger separation area than cylindrical tube 112 which allows for formation of a larger flock aggregate. There may be more or less than five electroflotation apparatuses 200 e.g. there may be one or more than one electroflotation apparatus 200, such as three to eight electroflotation apparatuses 200, expelling flock and treated water into the pool 200.

Figure 3:
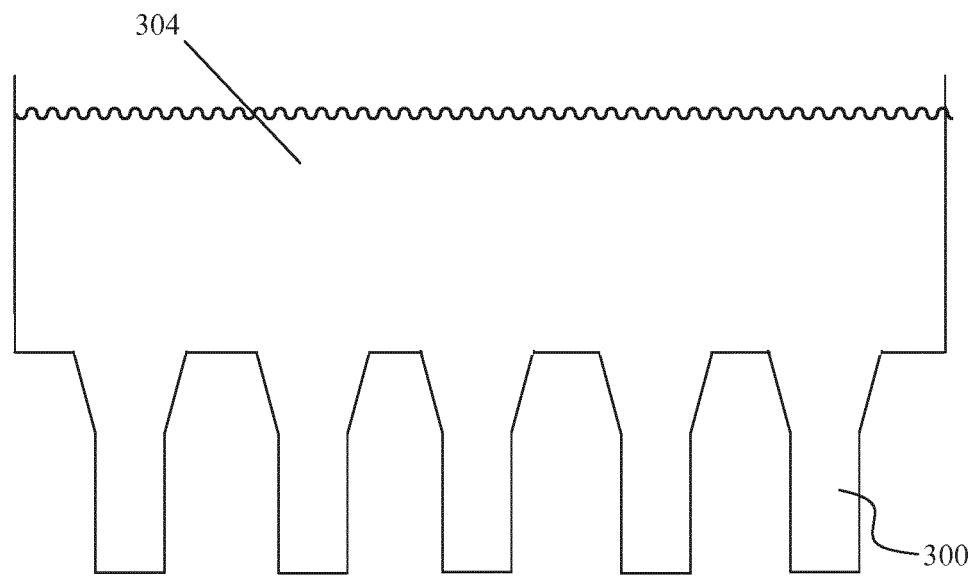
FIG. 3 is a side view of another pool with a plurality of electroflotation apparatuses according to an alternative embodiment of the invention.

FIG. 3 depicts a pool 304 with five electroflotation apparatuses 300 located below the pool 304. Electroflotation apparatus 300 is similar in design and operation to electroflotation apparatus 100. Like pool 204, pool 304 provides a larger separation area than cylindrical tube 112 and thus formation of a larger flock aggregate. Locating electroflotation apparatuses 300 below the pool 304 allows for an improved separation of the flock from the water at the surface of the pool 304. Again, there may be more or less than five electroflotation apparatuses 300 such as four or ten electroflotation apparatuses 300 all expelling flock and treated water into the pool 300.

Figure 4A:
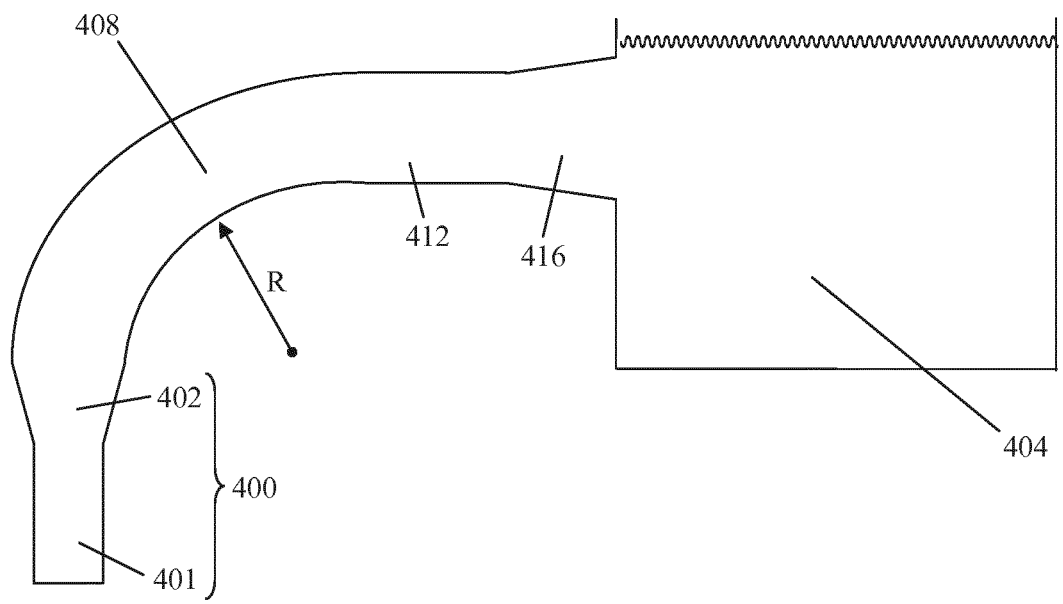
FIG. 4*a* is a side view of an electroflotation apparatus connected to the side of a pool according to an embodiment of the invention.
Figure 4B:
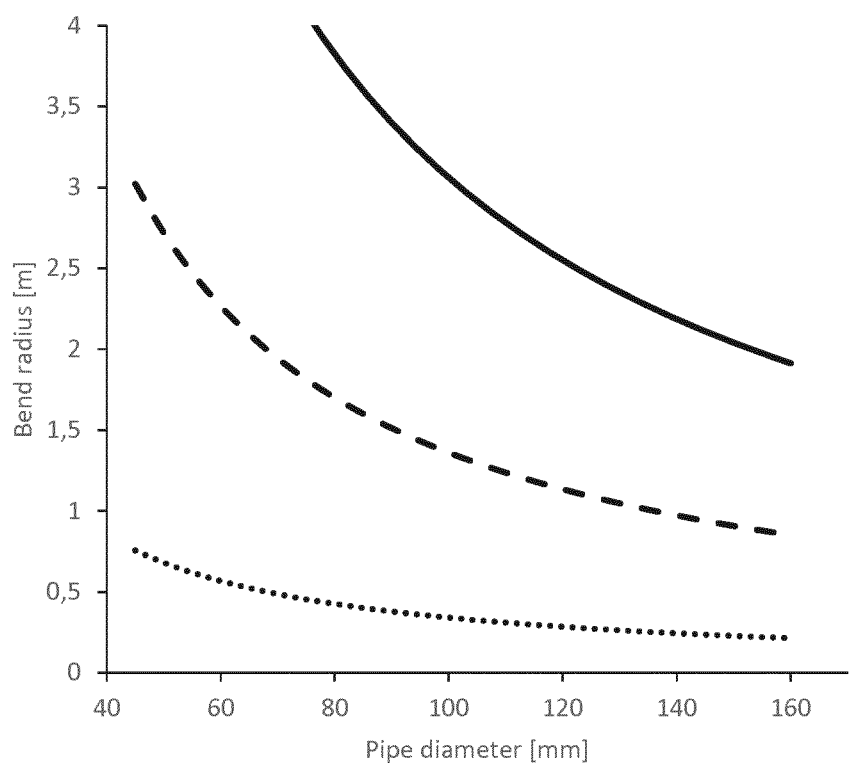
FIG. 4*b* is a graph of bending radius (meters) versus pipe diameter (millimeters) of the curved pipe in FIG. 4*a* at flow rates of 500 litres/hour (dotted line . . . . . . . . ), 1000 litres/hour (dashed line - - - - - - ), and 1500 litres/hour (solid line _____).

FIG. 4a shows an electroflotation apparatus 400 connected to the side of a pool 404 via a curved pipe 408, a linear stabilizing zone 412, and a conical outlet 416. The apparatus 400 has an electrolytic cell 401 and an outlet pipe 402. One end of the curved pipe 408 connects directly to the exit end (i.e. second end) of outlet pipe 402. In use the outlet pipe 402 reduces the turbulence of the treated water from the electrolytic cell 401 and creates a laminar flow of treated water that is preserved as the treated water passes from the outlet pipe 402 and through curved pipe 408 on the way to pool 404. The curved pipe 408 is made of a flexible material. The diameter and bending radius (R) of the curved pipe 408 are selected in order to preserve the laminar flow of the treated water. FIG. 4b illustrates the relationship between the bending radius (R) and the diameter of the curved pipe 408 at different flow rates as calculated by a computational fluid dynamics (CFD) analysis. Generally, as the pipe diameter increases the bending radius of the curved pipe 408 decreases for a given flow rate. Of course the diameter of the curved pipe 408 may be larger than 160 mm as shown on the horizontal axis of the graph in FIG. 4b. Although not illustrated, the diameter of the curved pipe 408 may be larger than the diameter of the exit of the outlet pipe 402. In that case one end of the curved pipe 408 extends over and/or below the exit of the outlet pipe 402 and is secured to the electrolytic cell 401 or below the exit of the outlet pipe 402 by any suitable method to prevent water leakage. Further, more than one electroflotation apparatus 400 and curved pipe 408 could be connected to different parts of the same pool 404. The linear zone 412 helps to preserve the laminar flow and avoid separation of the water and flock in the conical outlet 416. The linear zone 416 could be any suitable length. For instance, the length of linear zone 412 may be about four times the diameter of the curved pipe 408. The conical outlet 416 is connected to the pool 404 and helps to preserve the laminar flow of the treated water should the flow stagnate after entering the pool 404. However, it is not necessary to include both the linear stabilizing zone 412 and conical outlet 416. In one embodiment either the linear stabilizing zone 412 or the conical outlet 416 may be present. Alternatively, neither the linear stabilizing zone 412 nor the conical outlet 416 are present. In the latter case one end of the curved pipe 408 is connected directly to the outlet pipe 402 while the other end of the curved pipe 408 is connected directly to the pool 404. Moreover, the conical outlet 416, linear zone 412, or the curved pipe 408 need not be connected to the side of the pool 404 as shown in FIG. 4a. For example, the conical outlet 416, linear zone 412, or the curved pipe 408 may be connected to the bottom of the pool 404 in order that the treated water enters the pool 404 from underneath. Alternatively, the conical outlet 416, linear zone 412, or the curved pipe 408 could be suspended over the top of pool 404 in order that the treated water enters the pool 404 from above.

Whether or not a pool 204, 304, 404 is utilized in place of cylindrical tube 112 as a separation area will depend on the volume of water to be treated. The relative location of electroflotation apparatuses 200, 300, 400 to the pools 204, 304, 404 will depend on the site space available and other engineering controls.

Figure 5:
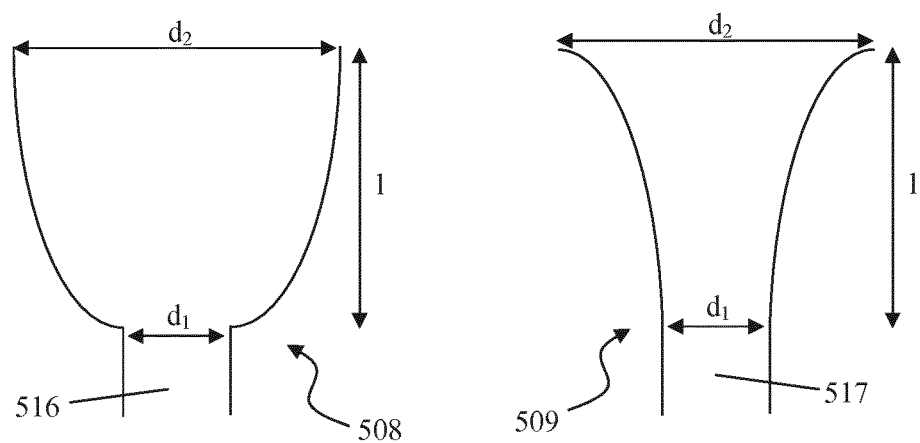
FIG. 5 is a side view of two alternative outlet pipe designs for use with the electroflotation apparatus according to an embodiment of the invention.

FIG. 5 illustrates two alternative outlet pipe designs 508, 509 for use with the electroflotation apparatuses 100, 200, 300, and 400. Outlet pipe 508 is a truncated parabolic cone. Outlet pipe 509 is a truncated hyperbolic cone. The outlet pipe 509 is preferred. Thus in some embodiments the outlet pipe of the electroflotation apparatus is a truncated hyperbolic cone.

The velocity of the water in and immediately external of the outlet pipe 108 of the electroflotation apparatus 100 was evaluated in a computational fluid dynamics (CFD) analysis. CFD is a branch of fluid mechanics that uses numerical analysis and algorithms to solve and analyze problems that involve fluid flows. The CFD analysis assumed a water temperature of 40° C. The turbulence model was realisable k-ε (two-layer) and a biphasic model (VOF) was used to model the flocking surface. Velocity is one aspect affecting the turbulence of the water.

Figure 6:
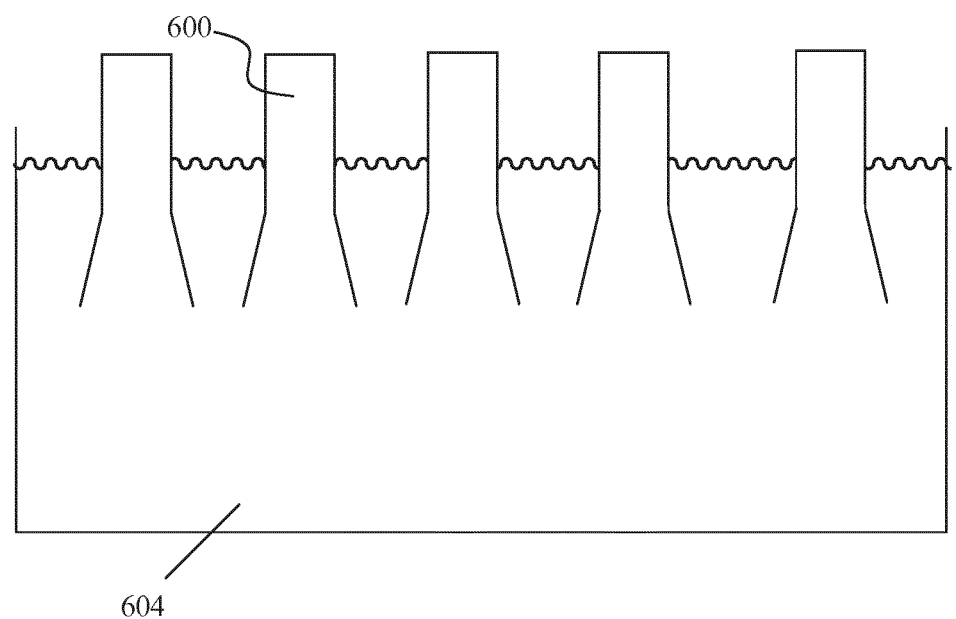
FIG. 6 is a side view of yet another pool with a plurality of electroflotation apparatuses according to an alternative embodiment of the invention.

FIG. 6 illustrates a pool 604 with five electroflotation apparatuses 600 located upside down in the pool 604 so that their outlet pipes and top portions of their electrolytic cells are located in the upper half of the pool 604. Otherwise electroflotation apparatus 600 is similar in design to electroflotation apparatus 100. During operation the water will move downwards through the electrolytic cells as it is treated prior to exiting the outlet pipe into the pool 604. Like pools 204 and 304, pool 604 provides a larger separation area than cylindrical tube 112 which allows for formation of a relatively larger flock aggregate. There may be more or less than five electroflotation apparatuses 600 e.g. there may be one or more than one electroflotation apparatus 600, such as three to eight electroflotation apparatuses 600, expelling flock and treated water into the pool 600. The expelled flock floats to the surface of the pool 604 around the apparatuses 600.

Use of a pool 204, 304, 404, or 604 allows for a simpler and less expensive construction as the weight of the treated water from one or more electroflotation apparatuses 200, 300, 400, 600 is carried by a single large pool.

Figure 7:
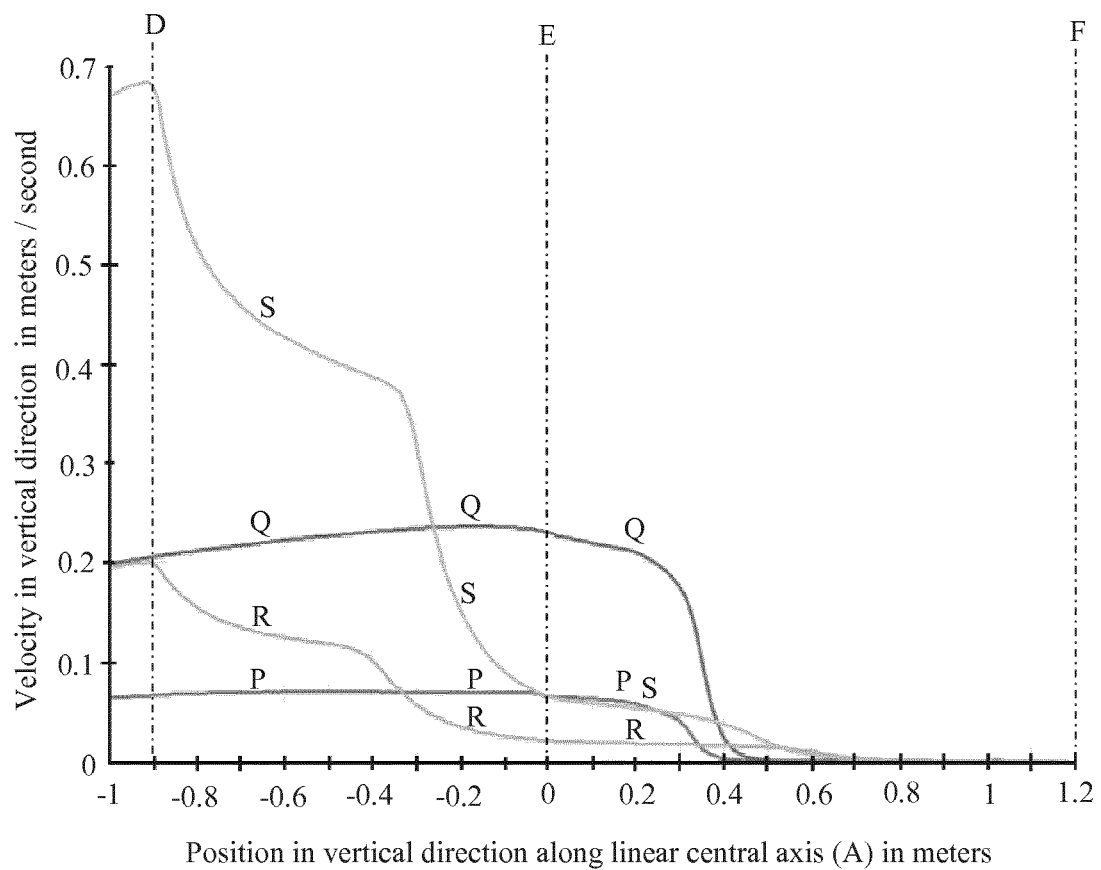
FIG. 7 is a graph of water velocity (meters/second) versus position (meters) of the water along the linear central axis of the outlet pipe of an electroflotation apparatus according to one embodiment of the invention.

FIG. 7 shows a graph of the CFD results for outlet pipe 108 in comparison to a straight cylindrical pipe i.e. a pipe with a constant diameter ($d_1=d_2=50$ mm) and having the same length (l) as outlet pipe 108. Using the straight cylindrical pipe is known to result in disintegration of flock above the electrolytic cell.

The key to FIG. 7 is:

D=first end of the outlet pipe 108/straight cylinder pipe.

E=second end of the outlet pipe 108/straight cylinder pipe.

F=water surface in the separation area.

P=straight cylinder pipe with a water throughput of 300 liters per hour.

Q=straight cylinder pipe with a water throughput of 1000 liters per hour.

R=outlet pipe 108 with a water throughput of 1000 liters per hour.

S=outlet pipe 108 with a water throughput of 3500 liters per hour.

FIG. 7 shows that the water has a much lower velocity while passing through, and just after exiting, outlet pipe 108 compared to the straight cylindrical pipe at the same water throughput (1000 liters per hour). Even at the higher water throughputs of 1000 and 3500 liters per hour, the outlet pipe 108 results in exiting water having a velocity similar to, or less than, the straight cylinder pipe at 300 liters per hour. The electroflotation apparatuses 100, 200, 300, 400 are expected to be capable of treating waste water at flow rates of up to 4000 l/h while simultaneously facilitating aggregation of flock formed during the treatment.

The beneficial effect of the outlet pipe 108 was demonstrated by measuring the quality of treated water obtained from passage of municipal waste water through an electroflotation apparatus 100 fitted with outlet pipe 108 and a straight cylindrical pipe i.e. a pipe with a constant diameter ($d_1=d_2=50$ mm) and having the same length (1) as outlet pipe 108. All other experimental conditions were constant. The quality was determined by measuring the turbidity of the treated water using a nephelometer. A person skilled in the art will understand that turbidity is the cloudiness or haziness of a fluid caused by large numbers of individual particles that are generally invisible to the naked eye. The measurement of turbidity is a key test of water quality. The results are shown in Table 1.

TABLE 1

Turbidity measurement of outgoing purified water from municipal waste water.

| Flow (l/h) | Turbidity (NTU) of water after treatment with electroflotation apparatus 100 fitted with a straight cylinder outlet pipe | Turbidity (NTU) of water after treatment with electroflotation apparatus 100 and outlet pipe 108 |
| --- | --- | --- |
| 300 | 33.5 | 14 |
| 600 | 54.9 | 18 |
| 900 | 61.4 | 19.9 |
| 1100 | 41.6 | 22.1 |
| 1200 | 63.3 | 29.8 |
| 1500 | 59 | 35.4 |
| 1800 | 63.6 | 34.6 |
| 1900 | 56.5 | 34.1 |
| 2000 | 67.2 | 44.5 |
| 2100 | 82.9 | 42.6 |

NTU = Nephelometric Turbidity Units.

As can be seen in Table 1, the turbidity of the treated water was significantly less (in fact often 2- to 3-fold less at most flow rates) when conical outlet pipe 108 was used instead of a straight cylinder pipe in the electroflotation apparatus 100. This shows the quality of the treated water is much higher after passage through an electroflotation apparatus 100 fitted with outlet pipe 108 rather than a straight cylindrical pipe.

Although the present invention has been described above with reference to specific illustrative embodiments, it is not intended to be limited to the specific form set forth herein. Any combination of the above mentioned embodiments should be appreciated as being within the scope of the invention. Rather, the invention is limited only by the accompanying claims and other embodiments than the specific above are equally possible within the scope of these appended claims.

In the claims, the term "comprises/comprising" does not exclude the presence of other species or steps. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc. do not preclude a plurality.

The invention claimed is:

1. An electroflotation apparatus for removing impurities from waste water comprising:
    an electrolytic cell for treating the waste water and generating a flock containing the impurities;
    an outlet pipe having a linear central axis located co-axially with the electrolytic cell for passing the treated water and flock from the electrolytic cell to a separation area, the outlet pipe comprising:
    a first end connected to the electrolytic cell and having a first diameter;
    a second end through which the treated water and flock exit the outlet pipe, the second end having a second diameter; and
    a length extending between the first diameter and the second diameter;
    wherein the ratio of the second diameter to the first diameter is between 1.5:1 and 6:1; and
    wherein the ratio of the length to the first diameter is between 7:1 and 45:1;
    in order that the outlet pipe reduces the turbulence of the treated water from the electrolytic cell before the treated water is passed to the separation area such that aggregation of the flock in the separation area is increased.

2. The apparatus according to claim 1, wherein the ratio of the second diameter to the first diameter is between 2:1 and 5:1.

3. The apparatus according to claim 1, wherein the ratio of the length to the first diameter is between 10:1 and 30:1.

4. The apparatus according to claim 1, wherein the outlet pipe is a truncated cone or a truncated hyperbolic cone.

5. The apparatus according to claim 4, wherein the aperture of the truncated cone is less than 10°.

6. The apparatus according to claim 4, wherein the aperture of the truncated cone is between 3° and 8°.

7. The apparatus according to claim 1, wherein the separation area is a cylindrical tube extending above the outlet pipe.

8. The apparatus according to claim 7, wherein the cylindrical tube has a cylinder diameter and the ratio of the cylinder diameter to the second diameter is at least 1.5:1.

9. The apparatus according to claim 7, wherein the cylindrical tube has a cylinder diameter and the ratio of the cylinder diameter to the second diameter is between 2:1 and 30:1.

10. The apparatus according to claim 1, wherein the separation area is a pool or a basin located above the outlet pipe.

11. The apparatus according to claim 10, wherein a curved pipe extends between the outlet pipe and the pool or the basin for passing the treated water and flock from the outlet pipe to the pool or the basin.

12. The apparatus according to claim 10, further comprising a linear stabilizing zone between the curved pipe and the pool or the basin.

13. The apparatus according to claim 10, further comprising a conical outlet between the curved pipe and the pool or the basin.

14. The apparatus according to claim 10, wherein the ratio of the diameter of the curved pipe to the first diameter the outlet pipe is between 1.5:1 and 6:1.

15. The apparatus according to claim 10, wherein the ratio of the diameter of the curved pipe to the first diameter the outlet pipe is between 2:1 and 5:1.

16. The apparatus according to claim 1, wherein the first end of the outlet pipe further comprises a cylindrical portion connected to the electrolytic cell.

17. The apparatus according to claim 16, wherein the cylindrical portion is between about 30 mm to 70 mm long.

18. The apparatus according to claim 16, wherein the cylindrical portion is about 50 mm long.

19. The apparatus according to claim 1, wherein the ratio of the second diameter to the first diameter is between 2.5:1 and 4:1.

20. The apparatus according to claim 1, wherein the ratio of the length to the first diameter is between 14:1 and 22:1.

\* \* \* \* \*